(12) United States Patent
Li et al.

(10) Patent No.: US 8,994,900 B2
(45) Date of Patent: Mar. 31, 2015

(54) DISPLAY MODULE, DISPLAY DEVICE AND METHOD OF MANUFACTURING THE DISPLAY MODULE

(71) Applicant: BOE Technology Group Co., Ltd., Beijing (CN)

(72) Inventors: Mingchao Li, Beijing (CN); Jaegeon You, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 184 days.

(21) Appl. No.: 13/703,109

(22) PCT Filed: Sep. 21, 2012

(86) PCT No.: PCT/CN2012/081752
§ 371 (c)(1),
(2) Date: Dec. 10, 2012

(87) PCT Pub. No.: WO2013/041046
PCT Pub. Date: Mar. 28, 2013

(65) Prior Publication Data
US 2014/0078432 A1    Mar. 20, 2014

(30) Foreign Application Priority Data
Sep. 21, 2011   (CN) .......................... 2011 1 0282212

(51) Int. Cl.
*G02F 1/1335*   (2006.01)
*G02F 1/1343*   (2006.01)
(Continued)

(52) U.S. Cl.
CPC ........ *G02F 1/133516* (2013.01); *G02F 1/1362* (2013.01); *G02F 2001/136222* (2013.01); *G02F 1/136209* (2013.01); *G02F 2001/133521* (2013.01)

USPC ...... 349/108; 349/80; 252/299.01; 252/299.5

(58) Field of Classification Search
CPC ............ G02F 1/1362; G02F 1/136209; G02F 2001/133512; G02F 2001/133514; G02F 2001/136222; G02F 1/133512; G02F 1/133514; G02F 2001/136209; C09K 19/52; C09K 19/542; C09K 19/586; C09K 19/38
USPC ............. 252/299.01, 299.5; 349/80, 106, 108
See application file for complete search history.

(56) References Cited

U.S. PATENT DOCUMENTS 6,873,382 B2 * 3/2005 Chang et al. .................. 349/106
6,912,024 B2   6/2005 Kim et al.
(Continued)

FOREIGN PATENT DOCUMENTS

CN         1469174 A      1/2004
CN       101149541 A      3/2008
(Continued)

OTHER PUBLICATIONS

English translation provided by Espacenet for CN 101149541, 2008.*
(Continued)

*Primary Examiner* — Shean C Wu
(74) *Attorney, Agent, or Firm* — Ladas & Parry LLP

(57) ABSTRACT

According to embodiments of the invention, there are provided a display module, a display device and a method of manufacturing the display module. The display module comprises an array structural layer and a color filter layer provided on a surface of the array structural layer. The color filter layer comprises black matrixes and color pixel layers, and the color pixel layers are formed between adjacent black matrixes, respectively.

19 Claims, 4 Drawing Sheets

(51) Int. Cl.
*C09K 19/54* (2006.01)
*G02F 1/1362* (2006.01)

(56) References Cited

U.S. PATENT DOCUMENTS

2004/0001170 A1 1/2004 Chang et al.
2010/0225858 A1 9/2010 Dong et al.

FOREIGN PATENT DOCUMENTS

| | | |
|---|---|---|
| CN | 101825802 A | 9/2010 |
| CN | 102681243 A | 9/2012 |
| JP | 06-043457 A | 2/1994 |
| JP | 2003-066214 A | 3/2003 |

OTHER PUBLICATIONS

First Chinese Office Action dated Mar. 5, 2014; Appln. No. 201110282212.X.
International Preliminary Report on Patentability; dated Mar. 25, 2014; PCT/CN2012/081752.
International Search Report mailed Jan. 3, 2013; PCT/CN2012/081752.

* cited by examiner

DISPLAY MODULE, DISPLAY DEVICE AND METHOD OF MANUFACTURING THE DISPLAY MODULE

TECHNICAL FIELD

Embodiments of the present invention relate to a display module, a display device and a method of manufacturing the display module.

BACKGROUND

In recent years, with the development of science and technology, the liquid crystal display technology has been continuously improved. Thin Film Transistor-Liquid Crystal Displays (TFT-LCDs) occupy an important place in the field of display device due to their advantages of good image quality, low power consumption, environmental protection and the like.

A conventional liquid crystal panel of the TFT-LCD is typically formed by assembling an array substrate and a color filter substrate, and liquid crystal molecules are Filled within a cavity formed by the assembling process. Because it is necessary to provide black matrixes for shielding light on the color filter substrate, the black matrixes need to strictly correspond to the non-transmissive region on the array substrate during the assembling process, so as to reduce the impact of the black matrixes on brightness of the liquid crystal panel.

However, during a practical manufacturing process of the liquid crystal panel, a certain device deviation inevitably occurs in the assembling process so that alignment of the black matrixes has a certain deviation, and thus transmittance of light from a backlight is greatly reduced owing to the light shielding function of the black matrix. In turn, aperture ratio of pixels is reduced, and it makes brightness of the whole product decreased. Therefore, image quality of the final LCD is degraded.

Further, color filter layer on the conventional color filter substrate typically adopt resin materials to form a red pixel resin layer, a green pixel resin layer and a blue pixel resin layer. However, during a practical manufacturing process, it is necessary to clean the substrate after one of the above color pixel layers is completed, and only the substrate which has been cleaned can be entered into the next step. The presence of a plurality of cleaning processes makes the procedure of producing the color filter substrate becoming complex, and thus the manufacture efficiency becomes low.

SUMMARY

According to an embodiment of the present invention, there is provided a display module. The display module comprises an array structural layer and a color filter layer provided on a surface of the array structural layer. The color filter layer comprises black matrixes and color pixel layers, and the color pixel layers are formed between adjacent black matrixes, respectively.

According to another embodiment of the present invention, there is provided a display device. The display device comprises: the above display module, a counter substrate and a liquid crystal layer filled between the display module and the counter substrate.

According to still another embodiment of the present invention, there is provided a method of manufacturing a display module. The method comprises: fabricating an array structural layer; forming black matrixes on the array structural layer; coating a color pixel mixture material on the array structural layer after the above structure has been completed; conducting an illumination on the color pixel mixture material, so that color pixel layers are formed between adjacent black matrixes, respectively.

According to the display device, the display module and the manufacturing method of the display module of the embodiments of the invention, the color filter layer is directly provided on the array structural layer, so that the problem that the aperture ratio of pixels is decreased owing to the deviation in alignment of the black matrixes in the conventional assembling process of the array substrate and the color filter substrate can be avoided. Accordingly, the aperture ratio of pixels can be effectively increased, and thereby the brightness of the final display device can be increased and the display quality of images can be improved. Meanwhile, mixtures of the chiral agent and the nematic liquid crystal, instead of conventional color filter resin materials, are used to form the color pixel layers. By controlling the content of the chiral agent, the pitch of cholesteric phase liquid crystal which is generated by inducement of the nematic liquid crystal can be adjusted, and in turn the color of the cholesteric liquid crystal can be determined and the production of the color pixel layers can be achieved. Accordingly, in the embodiments of the invention, the cleaning processes, which need to be conducted for many times in the conventional technology, to be decreased in the process for forming the color pixel layers, and thereby the processing steps can be simplified and the production efficiency can be increased.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

According to an embodiment of the invention, there is provided a display module. The display module comprises an array structural layer and a color filter layer.

The array structural layer is a structural layer of a conventional array substrate. The array structural layer comprises a plurality of gate lines and a plurality of data lines. These gate lines and data lines intersect with each other to thereby define a plurality of pixel units arranged in a matrix form. Each of the pixel units comprises a thin film transistor functioning as a switch element and a pixel electrode for controlling arrangement of liquid crystal molecules. For example, for the thin film transistor of each of the pixel units, its gate electrode is electrically connected to or integrally formed with a corresponding gate line, its source electrode is electrically connected to or integrally formed with a corresponding data line, and its drain electrode is electrically connected to or integrally formed with a corresponding pixel electrode. Furthermore, the array structural layer may further comprise a common electrode layer. The following description will be made mainly based on a single pixel unit, but other pixel units may be formed in the same way. The above array structural layer may be manufactured by using a procedure of manufacturing the conventional array substrate.

Figure 11:
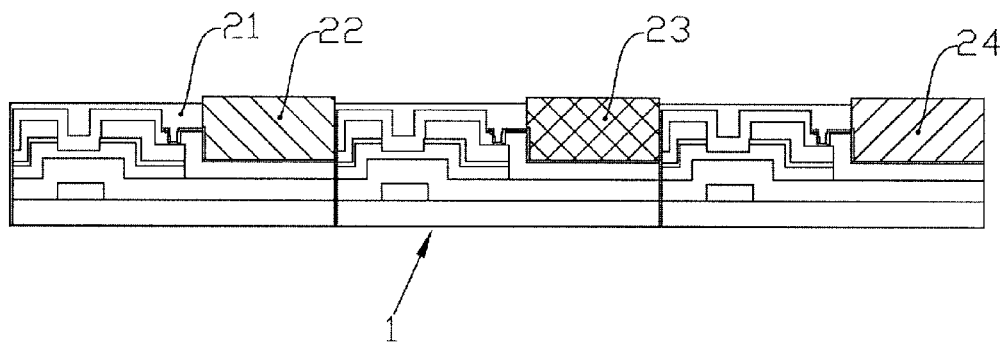
FIG. 11 is a structurally schematic view illustrating a pixel unit of a display module according to an embodiment of the invention.

FIG. 11 is a structurally schematic view illustrating a pixel unit of the display module according to the embodiment of the invention. As shown in FIG. 11, the color filter layer is directly provided on the surface of the array structural layer 1. The color filter layer comprises black matrixes 21 and color pixel layers. The color pixel layers are formed between adjacent black matrixes 21, respectively. The black matrixes 21 are provided on the surface of a non-transmissive region of the array structural layer, and the non-transmissive region at least comprises areas of the gate electrode, the gate line, the data line and the source and drain electrodes.

For example, the color pixel layers comprise a red pixel layer 22, a green pixel layer 23 and a blue pixel layer 24, and are made from color pixel mixture material which is composed of nematic liquid crystal, a reactive monomer and a chiral agent of different contents.

The molecular formula of the nematic liquid crystal is as follows:

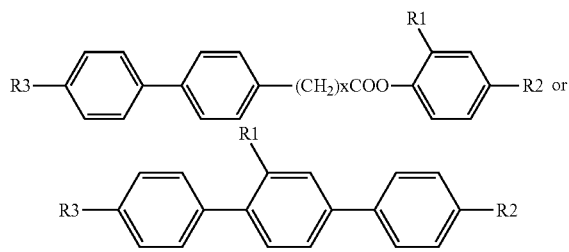

Wherein, R1 is halogen (F, Cl, Br, or the like), or other strongly electron-withdrawing group: —CN, —NO$_2$, —COOR, etc.

Wherein, R2=—O(CH$_2$)$_x$CH=CH$_2$ and x=1, 2, 3.

Wherein, R3=C$_n$H2$_{n+1}$ n=1, 2, 3, 4, 5.

The chiral agent is a compound containing a chiral component, and may have a chiral carbon atom C* as shown below, in which A, B, D and E are groups different from each other. Alternatively, the chiral agent may have other chiral center.

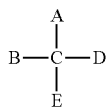

Wherein, the reactive monomer is a mixture of a hydrocarbon containing a polymerizable double bond and a photo initiator.

Wherein, the photo initiator may be a common photo initiator, and mainly comprises the following types and the first type is preferable:

1. benzoin and derivatives thereof, such as styrax, benzoin dimethyl ether, benzoin ethyl ether, benzoin isopropyl ether, benzoin butyl ether;
2. benzils, such as diphenyl-ethanone, α,α-dimethoxy-α-phenyl phenyl-ethanone;
3. alkylphenones, such as α,α-diethoxy-phenyl-ethanone, α-hydroxy alkylphenone, α-amino alkylphenone;
4. acyl phosphorus oxides, such as aroyl phosphine oxide, bis-benzoyl phenyl phosphine oxide;
5. benzophenones, such as benzophenone, 2,4-dihydroxy benzophenone, Michler's ketone;
6. thioxanthones, such as thiopropoxy thioxanthone, isopropyl thioxanthone.

When the content of the chiral agent is 18%-22% of the total amount of the color pixel mixture material, the color pixel mixture material is shown in blue B. Preferably, the content of the chiral agent is 20% of the total amount of the color pixel mixture material, and in this case, reflective wavelength of the nematic liquid crystal is closest to the centre wavelength of the blue, so that the blue color is more brilliant and the chromaticity of the blue is the best. The degree of being shown in the blue color may be tested by using a spectrometer, in which the centre wavelength of the blue is 460 nm. The amount of the chiral agent continues to be added, so that the content of the chiral agent is 23%-27% of the total amount of the color pixel mixture material, and the color pixel mixture material is shown in green G. Preferably, the content of the chiral agent is 25% of the total amount of the color pixel mixture material, and in this case, reflective wavelength of the nematic liquid crystal is closest to the centre wavelength of the green, so that the green color is more brilliant and the chromaticity of the green is the best. The degree of being shown in the green color may be tested by using the spectrometer, in which the centre wavelength of the green is 530 nm. The amount of the chiral agent continues to be added, so that the content of the chiral agent is 28%-32% of the total amount of the color pixel mixture material, and the color pixel mixture material is shown in red R. Preferably, the content of the chiral agent is 30% of the total amount of the color pixel mixture material, and in this case, reflective wavelength of the nematic liquid crystal is closest to the centre wavelength of the red, so that the red color is more brilliant and the chromaticity of the red is the best. The degree of being shown in the red color may be tested by using the spectrometer, in which the centre wavelength of the red is 660 nm.

The display module according to the embodiment of the invention employs the color filter layer which is directly provided on the array structural layer, so that the problem that the aperture ratio of pixels is decreased owing to the deviation in alignment of the black matrixes in the conventional assembling process of the array substrate and the color filter substrate can be avoided. Accordingly, in the embodiment of the invention, the aperture ratio of pixels can be effectively increased, and thereby the brightness of the final display device can be increased and the display quality of images can be improved. Meanwhile, the display module according to the embodiment of the invention is a reflective mode display module, and mixtures of the chiral agent and the nematic liquid crystal, instead of conventional color filter resin materials, are used to form the color pixel layers. By controlling the content of the chiral agent, the pitch of cholesteric phase liquid crystal which is generated by inducement of the nematic liquid crystal can be adjusted, and in turn the color of the cholesteric liquid crystal can be determined and the production of the color pixel layers can be achieved. As compared to the conventional technology, the embodiment of the invention allow the cleaning processes, which need to be conducted for many times in the conventional technology, to be decreased in the process for forming the color pixel layers, and thereby the processing steps can be simplified and the production efficiency can be increased.

Further, according to an embodiment of the invention, there is provided a display device comprising the above display module. The display device may be formed by performing a process of assembling the above-described display module and a counter substrate and a process of filling liquid crystal molecules between the display module and the counter substrate. For example, the counter substrate is made of transparent glass substrate. Since the black matrixes are directly formed on the array structural layer, positions of the black matrixes can be controlled precisely, and thus the problem that the aperture ratio of pixels is decreased owing to the deviation in alignment of the black matrixes in the conventional assembling process of the array substrate and the color filter substrate can be avoided. Accordingly, in the display device according to the embodiment of the invention, the aperture ratio of pixels can be effectively increased, and thereby the brightness of the display device can be increased and the display quality of images can be improved. Meanwhile, as described above, the cleaning processes, which need to be conducted for many times in the conventional technology, can be decreased in the process for forming the color pixel layers, and thereby the processing steps can be simplified and the production efficiency can be increased.

Further, according to an embodiment of the invention, there is provided a method of manufacturing a display module. The method may comprise the following steps.

Step S1201, an array structural layer is fabricated. The array structural layer is a structural layer of a conventional array substrate. The array structural layer comprises a plurality of gate lines and a plurality of data lines. These gate lines and data lines intersect with each other to thereby define a plurality of pixel units arranged in a matrix form. Each of the pixel units comprises a thin film transistor functioning as a switch element and a pixel electrode for controlling arrangement of liquid crystal molecules. For example, for the thin film transistor of each of the pixel units, its gate electrode is electrically connected to or integrally formed with a corresponding gate line, its source electrode is electrically connected to or integrally formed with a corresponding data line, and its drain electrode is electrically connected to or integrally formed with a corresponding pixel electrode. Furthermore, the array structural layer may further comprise a common electrode layer. The above array structural layer may be manufactured by using a procedure of manufacturing the conventional array substrate.

Step S1202, black matrixes are formed on the array structural layer by a patterning process. The black matrixes are provided on the surface of a non-transmissive region of the array structural layer, and the non-transmissive region at least comprises areas of the gate electrode, the gate line, the data line and the source and drain electrodes.

Step S1203, a color pixel mixture material is coated on the array structural layer after the Step S1202. The color pixel mixture material is formed by mixing nematic liquid crystal, a reactive monomer and a chiral agent. The content of the chiral agent may be varied so that the color pixel mixture material is shown in blue, green and red, respectively. In the case that the chiral agent has different contents, cholesteric liquid crystal generated in the color pixel mixture material has different pitches and thus the reflective wavelength thereof is changed. In turn, pixel layers with different colors will be produced.

Step S1204, a region in which color pixel layers are to be formed is illuminated with a mercury lamp, so as to fix the pitch of the cholesteric liquid crystal which is generated in the color pixel mixture material. The color pixel layers comprise, for example, a blue pixel layer, a green pixel layer and a red pixel layer.

Step S1205, the region illuminated in the step S1204 continues to be illuminated with UV light.

The display module manufactured by the method according to the embodiment of the invention is a reflective mode display module, and mixtures of the chiral agent and the nematic liquid crystal, instead of conventional color filter resin materials, are used to form the color pixel layers. By controlling the content of the chiral agent, the pitch of cholesteric phase liquid crystal which is generated by inducement of the nematic liquid crystal can be adjusted, and in turn the color of the cholesteric liquid crystal can be determined and the production of the color pixel layers can be achieved. As compared to the conventional technology, the method according to the embodiment of the invention allow the cleaning processes, which need to be conducted for many times in the conventional technology, to be decreased in the process for forming the color pixel layers, and thereby the processing steps can be simplified and the production efficiency can be increased.

As an example, the method of manufacturing the display module according to the embodiment of the invention will be described in detail below in combination with FIGS. 1-11. It should be noted that, the following description is made mainly on a single pixel unit, but other pixel units may be formed in the same way.

The method of manufacturing the display module according to the embodiment of the invention may comprise the following steps:

Step S1301, the array structural layer 1 is fabricated.

Figure 1:
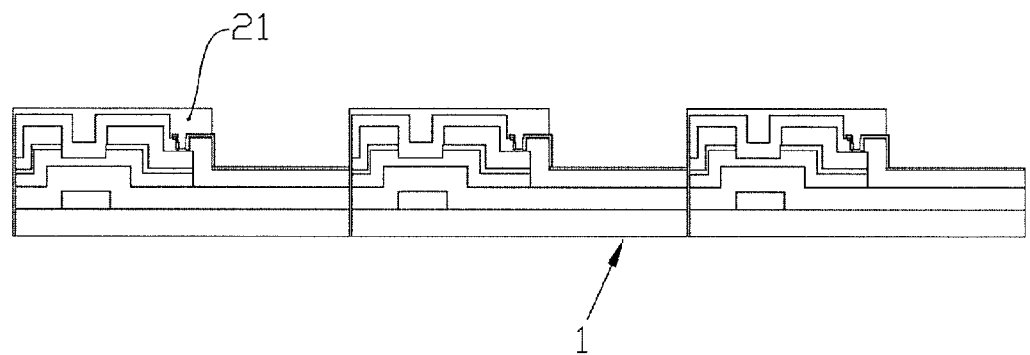
FIG. 1 to FIG. 10 are schematic views illustrating steps in a method of manufacturing a display module according to an embodiment of the invention, in which only one pixel unit of the display module is shown as an example.

Step S1302, the black matrixes 21 are formed on the array structural layer 1 by a patterning process. Referring to FIG. 1, the black matrixes 21 are provided on the surface of the non-transmissive region of the array structural layer 1, and the non-transmissive region at least comprises areas of the gate electrode, the gate line, the data line and the source and drain electrodes.

Figure 2:
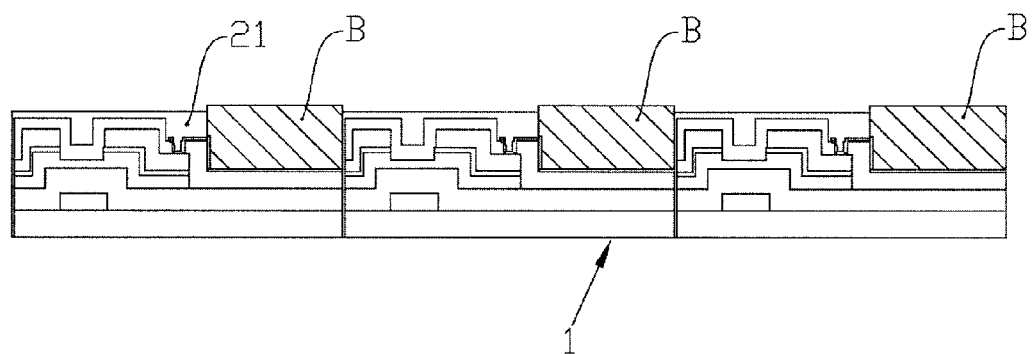

Step S1303, the color pixel mixture material is coated on the array structural layer after the step S1302, as shown in FIG. 2. The color pixel mixture material is formed by mixing nematic liquid crystal, the reactive monomer and the chiral agent. For example, the nematic liquid crystal is firstly mixed with the reactive monomer, the resultant mixture is heated to a temperature beyond a clearing point, and then the resultant mixture is cooled to a room temperature and the chiral agent is added into it. The reactive monomer is a mixture of a hydrocarbon containing a polymerizable double bond and a photo initiator. The content of the chiral agent is controlled to be 20% of the total amount of the color pixel mixture material, so that the color pixel mixture material is shown in blue B.

Figure 3:
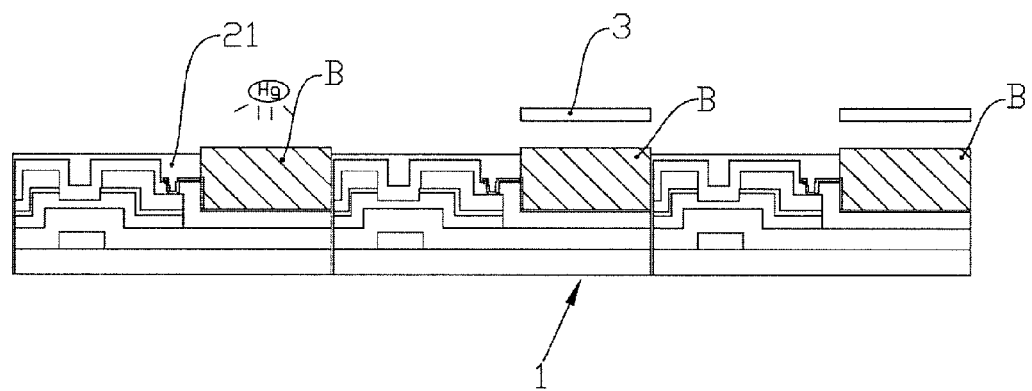

Step S1304, a region in which the blue pixel layer is to be formed is illuminated with a mercury lamp, so as to fix the pitch of cholesteric liquid crystal which is generated in the color pixel mixture material shown in blue. Referring to FIG. 3, a blue region in which the blue pixel layer is to be formed is illuminated with the mercury lamp, and the other regions are shielded with a mask 3.

Figure 4:
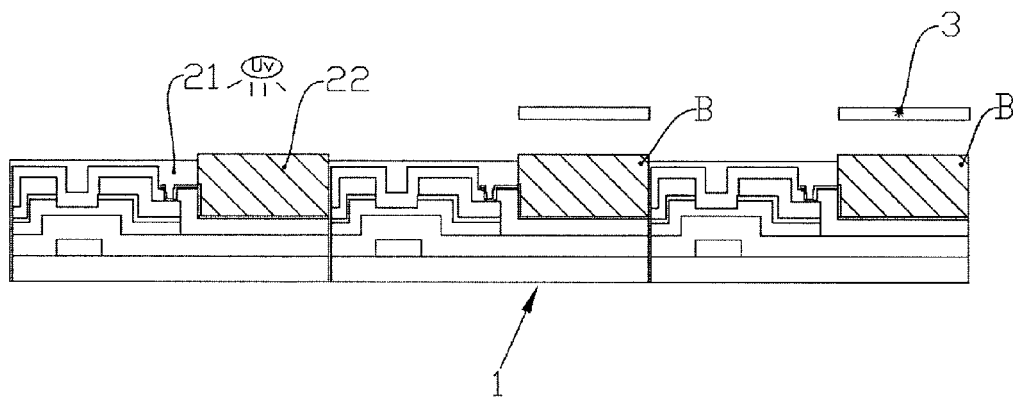

Step S1305, the region illuminated in the step S1304 is further illuminated with ultraviolet light. Referring to FIG. 4, the region in which the blue pixel layer 22 is to be formed is changed to be illuminated with ultraviolet light. Illumination with ultraviolet light causes the reactive monomer to be polymerized, thus the blue pixel layer 22 is formed and the blue color in the formed blue pixel layer 22 is more stable.

Figure 5:
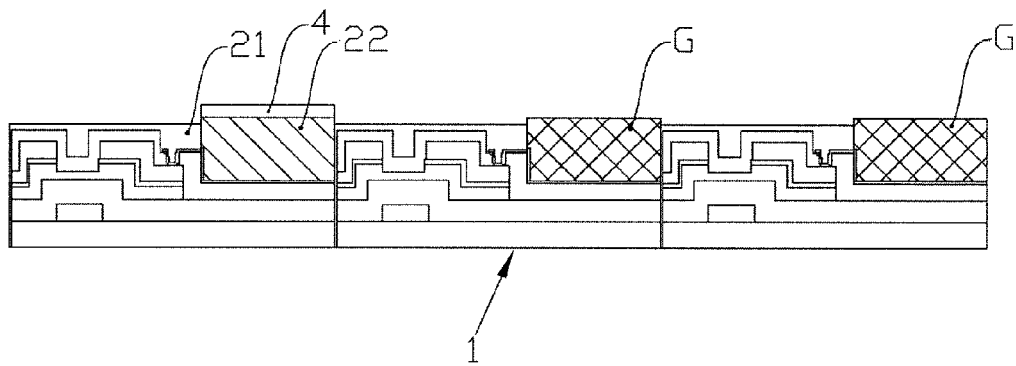

Step S1306, referring to FIG. 5, the chiral agent 4 continues to be added into the color pixel mixture material coated in the step S1303, so that the content of the chiral agent is 25% of the total amount of the color pixel mixture material and the color pixel mixture material is shown in green G.

As the blue pixel layer 22 has been formed and the state of the blue pixel layer 22 is very stable after it is illuminated by the mercury lamp and the ultraviolet light, the added chiral agent 4 will not affect the color of the blue pixel layer 22. In the region of the blue pixel layer 22, the added chiral agent 4 only locates on the surface of the blue pixel layer 22. In other regions than the region of the blue pixel layer 22, the color pixel mixture material is changed to be shown in green due to the added chiral agent 4.

Figure 6:
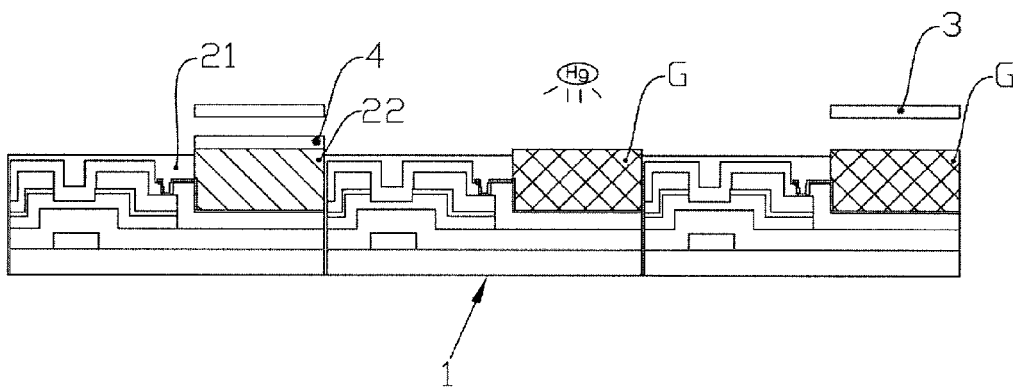

Step S1307, a region in which the green pixel layer is to be formed is illuminated with the mercury lamp, so as to fix the pitch of cholesteric liquid crystal which is generated in the color pixel mixture material shown in green. Referring to FIG. 6, a green region in which the green pixel layer is to be formed is illuminated with the mercury lamp, and other regions are shielded with a mask 3.

Figure 7:
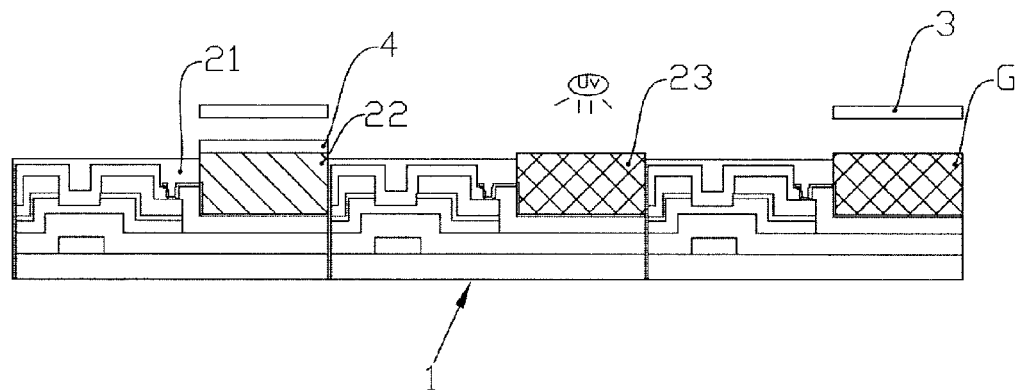

Step S1308, referring to FIG. 7, the region illuminated in the step S1307 is further illuminated with ultraviolet light so as to cause the reactive monomer to be polymerized, and thus the green pixel layer 23 is formed and the green color in the formed green pixel layer 23 is more stable.

Figure 8:
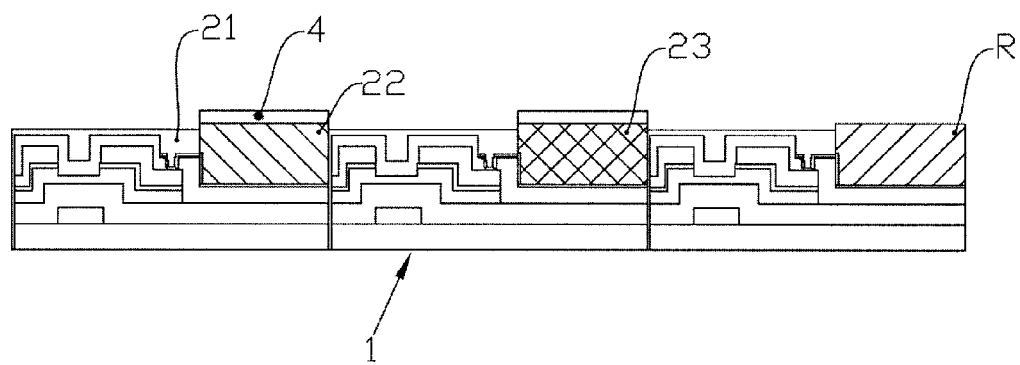

Step S1309, referring to FIG. 8, the chiral agent continues to be added into the color pixel mixture material of the step S1306, so that the content of the chiral agent is 30% of the total amount of the color pixel mixture material and the color pixel mixture material is shown in red R.

As the blue pixel layer 22 and the green pixel layer 23 have been formed and the states of the blue pixel layer 22 and the green pixel layer 23 are very stable after they are illuminated by the mercury lamp and the ultraviolet light, the added chiral agent 4 in this step will not affect the colors of the blue pixel layer 22 and the green pixel layer 23. In the regions of the blue pixel layer 22 and the green pixel layer 23, the added chiral agent 4 only locates on the surface of the blue pixel layer 22 and the green pixel layer 23. In other regions than the regions of the blue pixel layer 22 and the green pixel layer 23, the color pixel mixture material is changed to be shown in red due to the added chiral agent 4.

Figure 9:
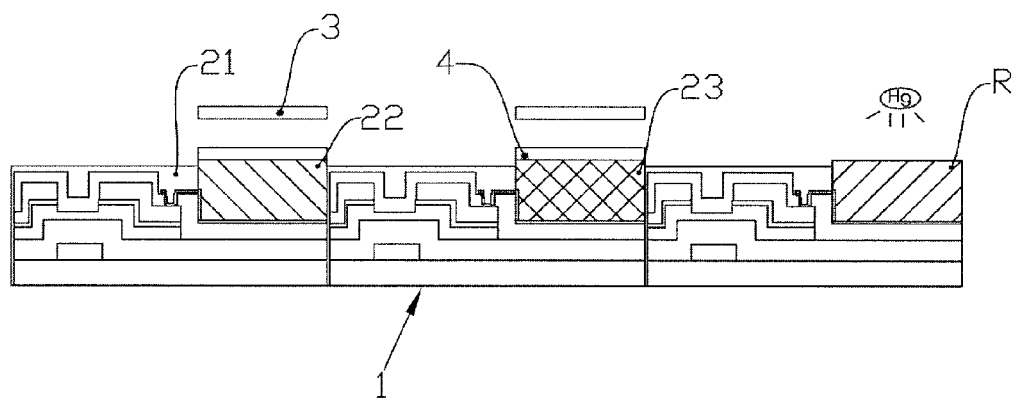

Step S1310, a region in which the red pixel layer is to be formed is illuminated with the mercury lamp, so as to fix the pitch of cholesteric liquid crystal which is generated in the color pixel mixture material shown in red. Referring to FIG. 9, a red region in which the red pixel layer is to be formed is illuminated with the mercury lamp, and other regions are shielded with a mask 3.

Figure 10:
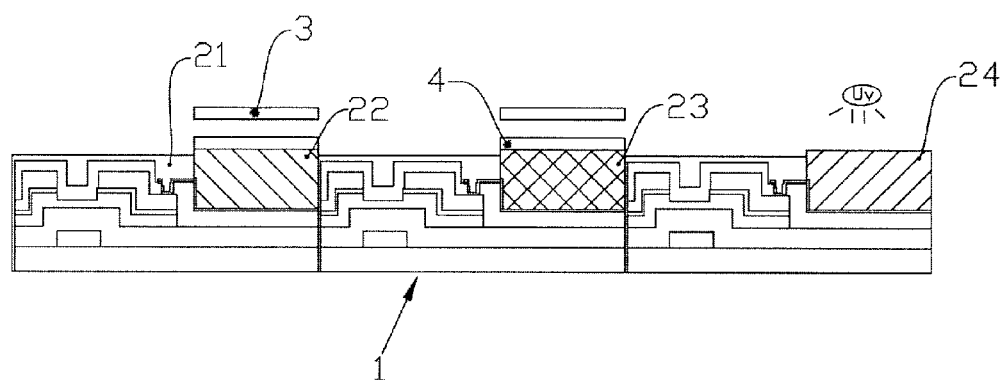

Step S1311, referring to FIG. 10, the region illuminated in the step S1310 is further illuminated with the ultraviolet light so as to cause the reactive monomer to be polymerized, and thus the red pixel layer 24 is formed and the red color in the formed red pixel layer 24 is more stable.

Step S1312, referring to FIG. 11, the substrate obtained by the step S1311 is cleaned to remove the chiral agent on the surfaces of the blue pixel layer 22 and the green pixel layer 23, and thus the display module is obtained.

According to the display device, the display module and the manufacturing method of the display module of the embodiments of the invention, the color filter layer is directly provided on the array structural layer, so that the problem that the aperture ratio of pixels is decreased owing to the deviation in alignment of the black matrixes in the conventional assembling process of the array substrate and the color filter substrate can be avoided. Accordingly, the aperture ratio of pixels can be effectively increased, and thereby the brightness of the final display device can be increased and the display quality of images can be improved. Meanwhile, mixtures of the chiral agent and the nematic liquid crystal, instead of conventional color filter resin materials, are used to form the color pixel layers. By controlling the content of the chiral agent, the pitch of cholesteric phase liquid crystal which is generated by inducement of the nematic liquid crystal can be adjusted, and in turn the color of the cholesteric liquid crystal can be determined and the production of the color pixel layers can be achieved. As compared to the conventional technology, the embodiments of the invention allow the cleaning processes, which need to be conducted for many times in the conventional technology, to be decreased in the process for forming the color pixel layers, and thereby the processing steps can be simplified and the production efficiency can be increased.

The forgoing descriptions are merely preferred embodiments of the invention. It should be noted that, a number of improvements and variances may further be made by those ordinarily skilled in the technical field on the premise that they do not depart from the technical principle of the invention; and these improvements and variances shall be deemed as within the protection scope of the present invention.

What is claimed is:

1. A display module, wherein
the display module comprises an array structural layer and a color filter layer provided on a surface of the array structural layer;
the color filter layer comprises black matrixes and color pixel layers;
the color pixel layers are formed between adjacent black matrixes, respectively; and
the color pixel layers are made from a color pixel mixture material composed of nematic liquid crystal, a reactive monomer and a chiral agent.

2. The display module according to claim 1, wherein the color pixel layers comprise a red pixel layer, a green pixel layer and a blue pixel layer.

3. The display module according to claim 2, wherein in the blue pixel layer, the content of the chiral agent is 18% to 22% of the total amount of the color pixel mixture material.

4. The display module according to claim 3, wherein in the blue pixel layer, the content of the chiral agent is 20% of the total amount of the color pixel mixture material.

5. The display module according to claim 2, wherein in the green pixel layer, the content of the chiral agent is 23% to 27% of the total amount of the color pixel mixture material.

6. The display module according to claim 5, wherein in the green pixel layer, the content of the chiral agent is 25% of the total amount of the color pixel mixture material.

7. The display module according to claim 2, wherein in the red pixel layer, the content of the chiral agent is 28% to 32% of the total amount of the color pixel mixture material.

8. The display module according to claim 7, wherein in the red pixel layer, the content of the chiral agent is 30% of the total amount of the color pixel mixture material.

9. The display module according to claim 1, wherein the reactive monomer is a mixture of a hydrocarbon containing a polymerizable double bond and a photo initiator.

10. The display module according to claim 1, wherein the array structural layer has a non-transmissive region, and the non-transmissive region at least comprises areas of a gate electrode, a gate line, a data line and source and drain electrodes, and wherein the black matrixes are provided on a surface of the non-transmissive region of the array structural layer.

11. A display device, comprising:
the display module according to claim 1;
a counter substrate; and
a liquid crystal layer filled between the display module and the counter substrate.

12. A method of manufacturing a display module, comprising:
fabricating an array structural layer;
forming black matrixes on the array structural layer;
coating a color pixel mixture material on the array structural layer after the above structure has been completed;
conducting an illumination on the color pixel mixture material, so that color pixel layers are formed between adjacent black matrixes, respectively;
wherein the color pixel mixture material is formed by mixing nematic liquid crystal, a reactive monomer and a chiral agent.

13. The method of manufacturing the display module according to claim 12,
wherein the step of coating the color pixel mixture material is: the nematic liquid crystal is mixed with the reactive monomer, the resultant mixture is heated to a temperature beyond a clearing point, then the resultant mixture is cooled to a room temperature and the chiral agent is added into it.

14. The method of manufacturing the display module according to claim 13, wherein the color pixel layers comprise a blue pixel layer, a green pixel layer and a red pixel layer.

15. The method of manufacturing the display module according to claim 14, wherein formation of the blue pixel layer, the green pixel layer and the red pixel layer comprises:
step 1, adding the chiral agent so that the content of the chiral agent is 18% to 22% of the total amount of the color pixel mixture material and the color pixel mixture material is shown in blue;
step 2, conducting an illumination on a region in which the blue pixel layer is to be formed so as to fix the pitch of cholesteric liquid crystal which is generated in the color pixel mixture material shown in blue, and shielding other regions with a mask;
step 3, further illuminating the region illuminated in the step 2 with ultraviolet light to cause the reactive monomer to be polymerized, so as to form the blue pixel layer;
step 4, adding the chiral agent continually so that the content of the chiral agent is 23% to 27% of the total amount of the color pixel mixture material and the color pixel mixture material is shown in green;
step 5, conducting an illumination on a region in which the green pixel layer is to be formed so as to fix the pitch of cholesteric liquid crystal which is generated in the color pixel mixture material shown in green, and shielding other regions with a mask;
step 6, further illuminating the region illuminated in the step 5 with ultraviolet light to cause the reactive monomer to be polymerized, so as to form the green pixel layer;
step 7, adding the chiral agent continually so that the content of the chiral agent is 28% to 32% of the total amount of the color pixel mixture material and the color pixel mixture material is shown in red;
step 8, conducting an illumination on a region in which the red pixel layer is to be formed so as to fix the pitch of cholesteric liquid crystal which is generated in the color pixel mixture material shown in red, and shielding other regions with a mask; and
step 9, further illuminating the region illuminated in the step 8 with ultraviolet light to cause the reactive monomer to be polymerized, so as to form the red pixel layer.

16. The method of manufacturing the display module according to claim 15, wherein in the step 1, the content of the chiral agent is 20% of the total amount of the color pixel mixture material;
wherein in the step 4, the content of the chiral agent is 25% of the total amount of the color pixel mixture material; and
wherein in the step 7, the content of the chiral agent is 30% of the total amount of the color pixel mixture material.

17. The method of manufacturing the display module according to claim 15, wherein in the step 2, the step 5 and the step 8, a mercury lamp is used to conduct the illumination.

18. The method of manufacturing the display module according to claim 13, wherein the reactive monomer is a mixture of a hydrocarbon containing a polymerizable double bond and a photo initiator.

19. The method of manufacturing the display module according to claim 12, wherein the array structural layer is formed to have a non-transmissive region, and the non-transmissive region at least comprises areas of a gate electrode, a gate line, a data line and source and drain electrodes; and
wherein the black matrixes are formed to be provided on a surface of the non-transmissive region of the array structural layer.

* * * * *